May 5, 1953  E. W. FAHEY  2,637,435
EGG HANDLING APPARATUS
Filed May 13, 1947  6 Sheets-Sheet 1

INVENTOR.
Edward W. Fahey,
BY
Cromwell, Greist & Warden
ATTYS.

May 5, 1953  E. W. FAHEY  2,637,435
EGG HANDLING APPARATUS
Filed May 13, 1947  6 Sheets-Sheet 2
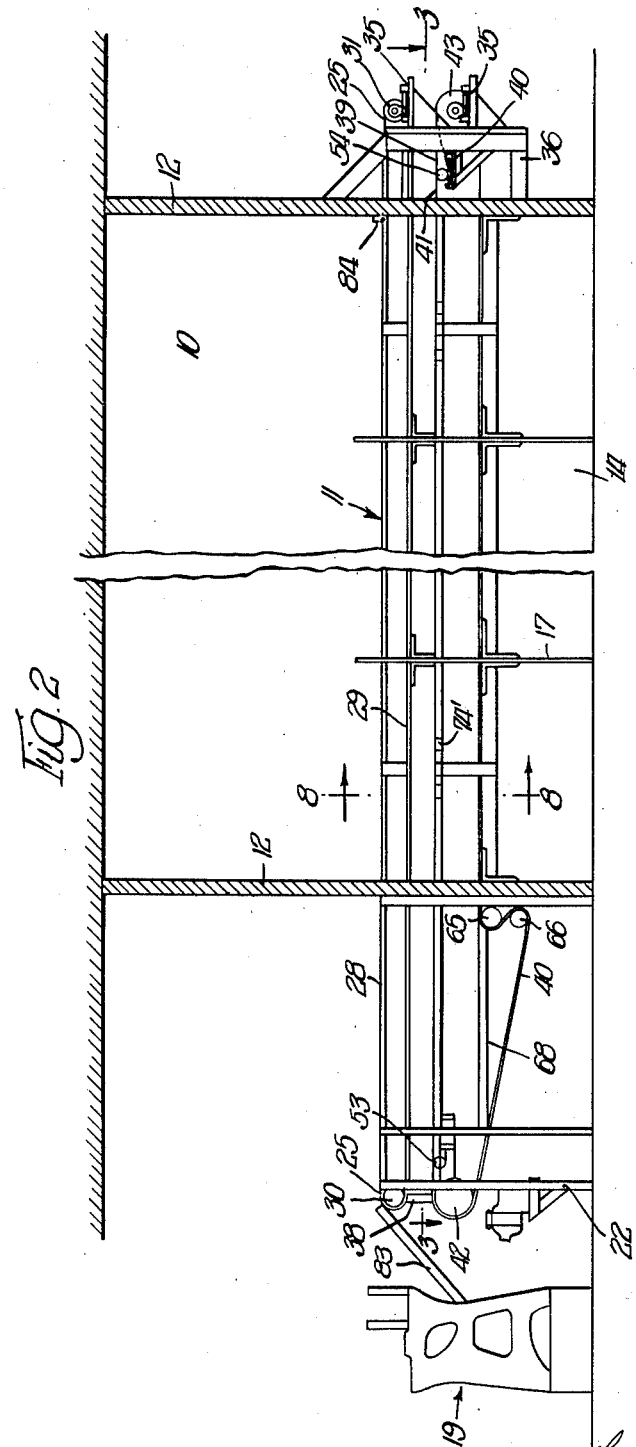
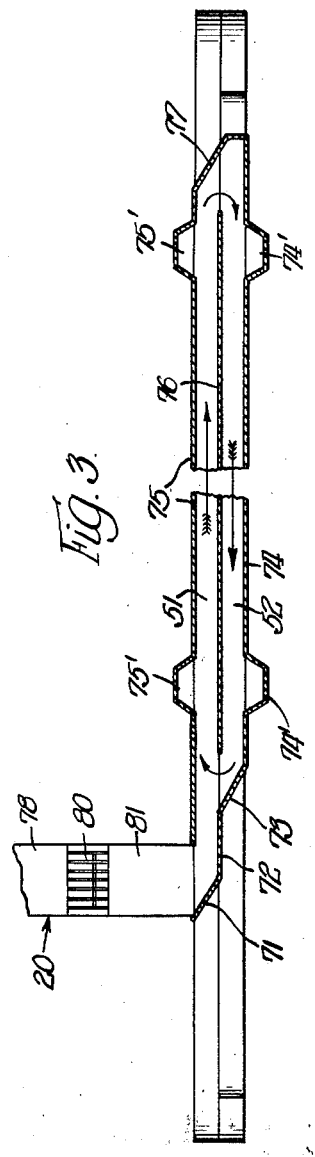
INVENTOR.
Edward W. Fahey,
BY
Cromwell, Greist + Warden
Attys May 5, 1953  E. W. FAHEY  2,637,435
EGG HANDLING APPARATUS
Filed May 13, 1947  6 Sheets-Sheet 3
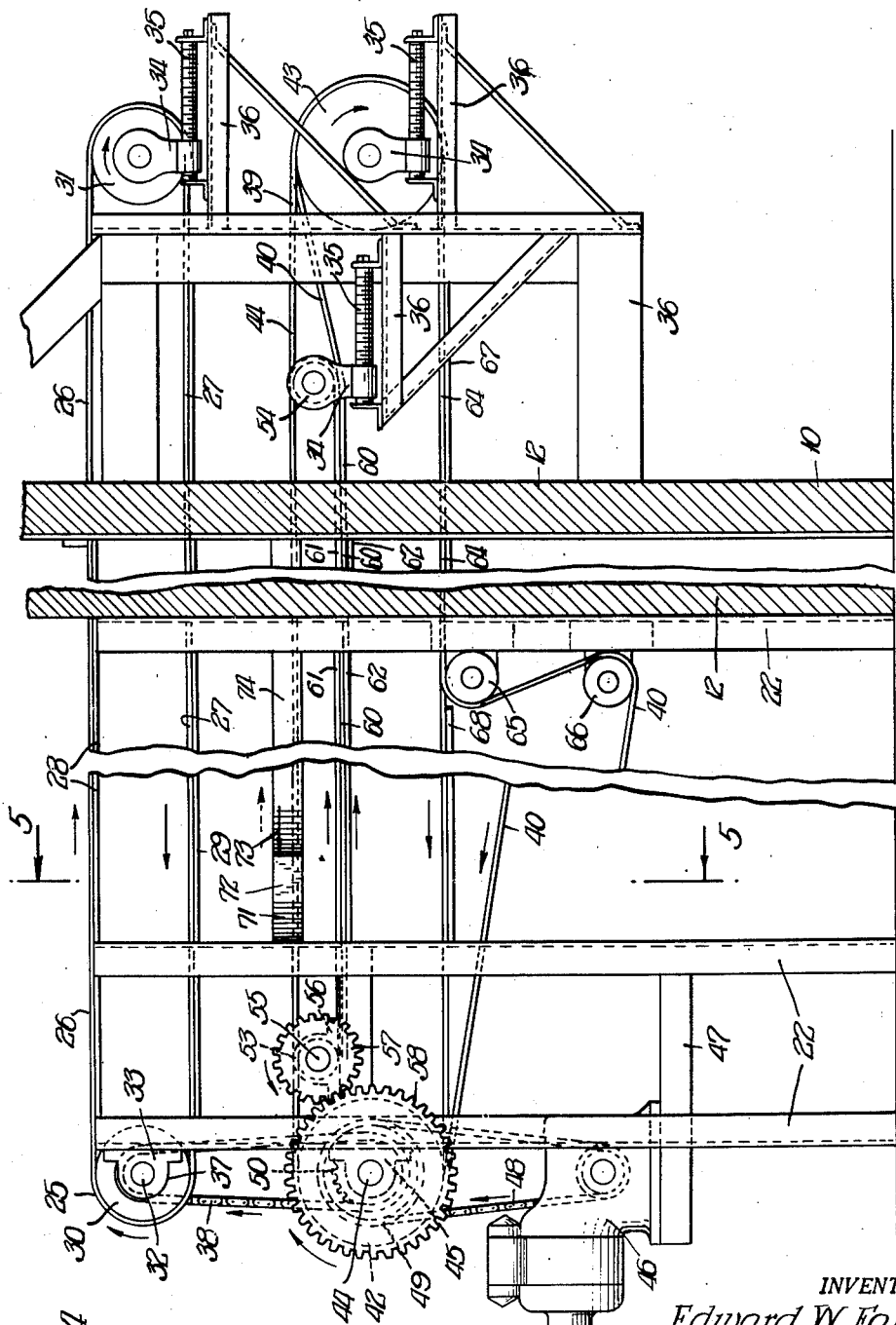
INVENTOR.
Edward W. Fahey,
BY
Cromwell, Greist + Warden
attys.

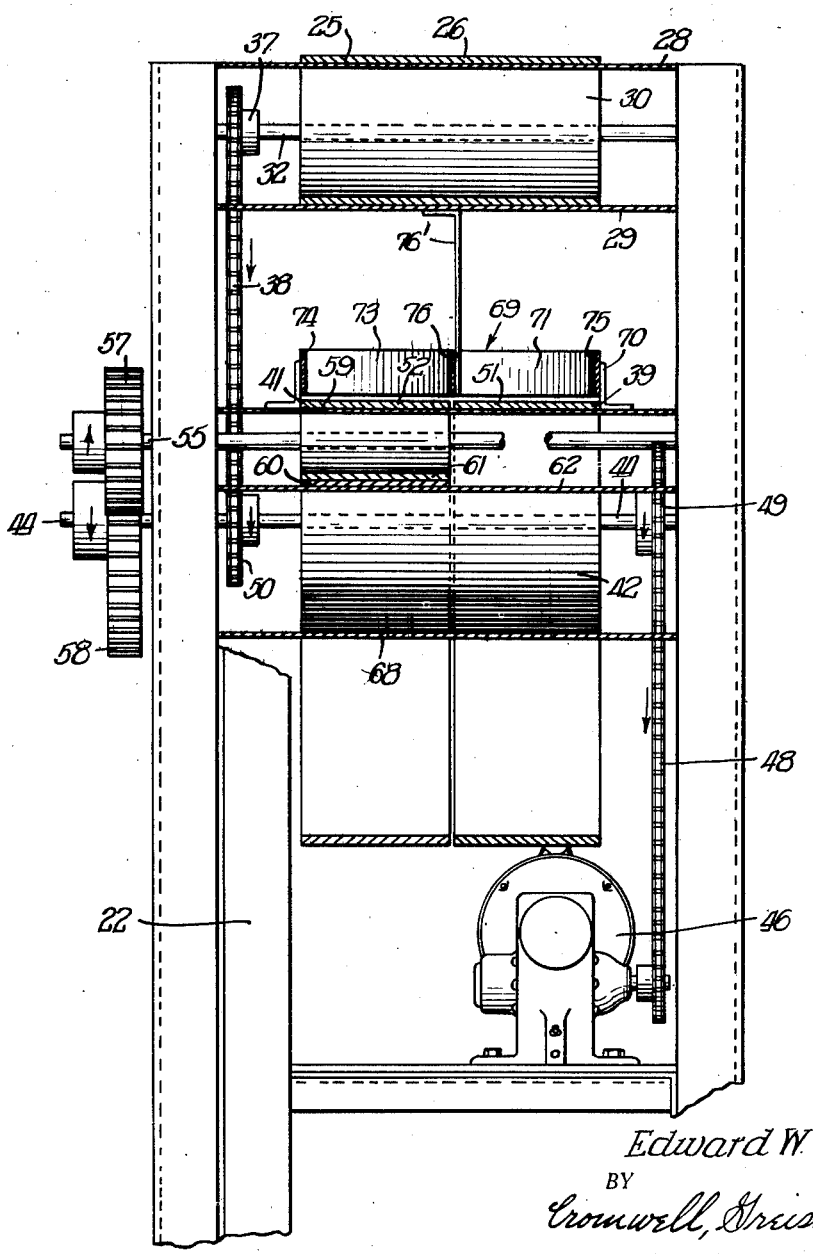

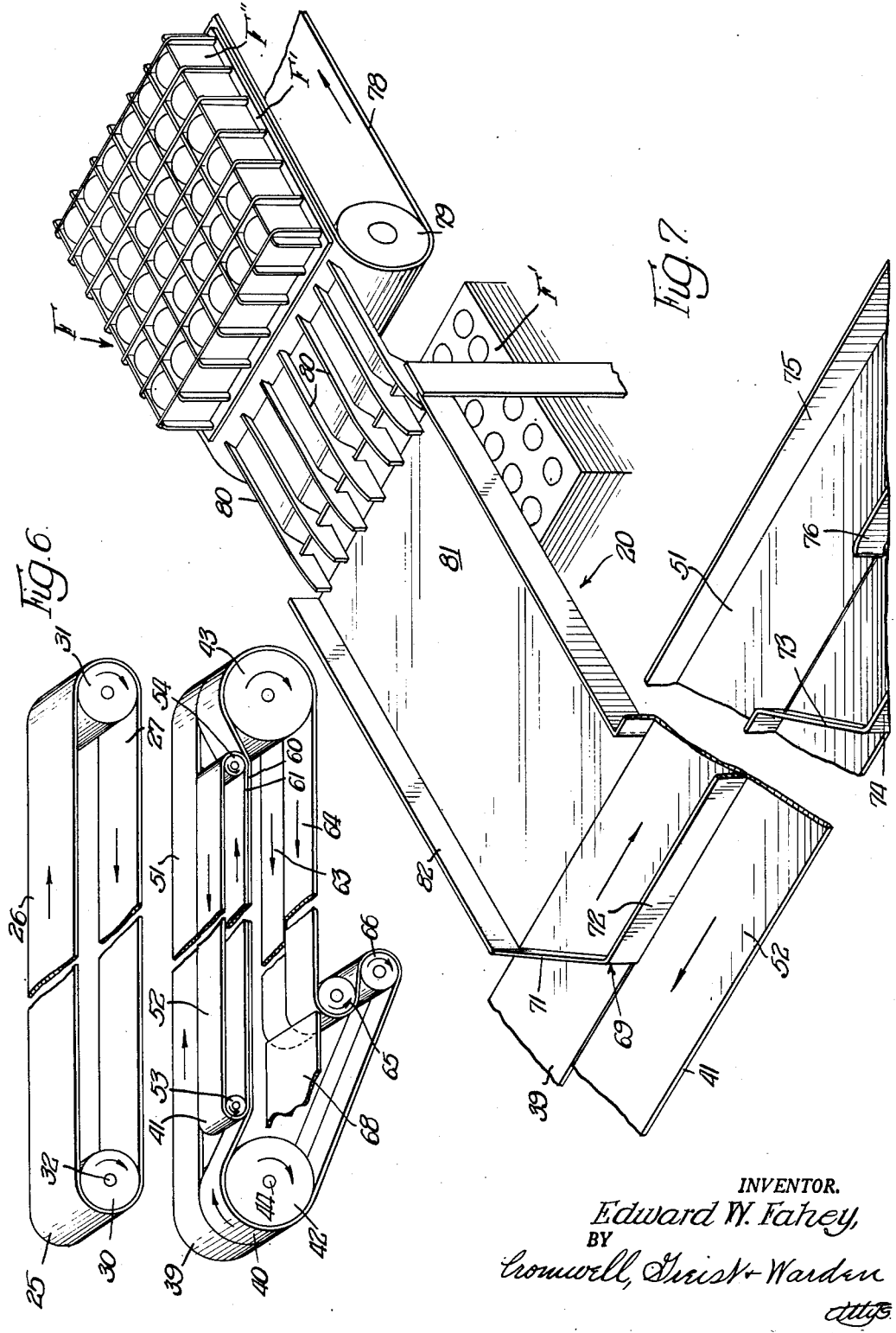

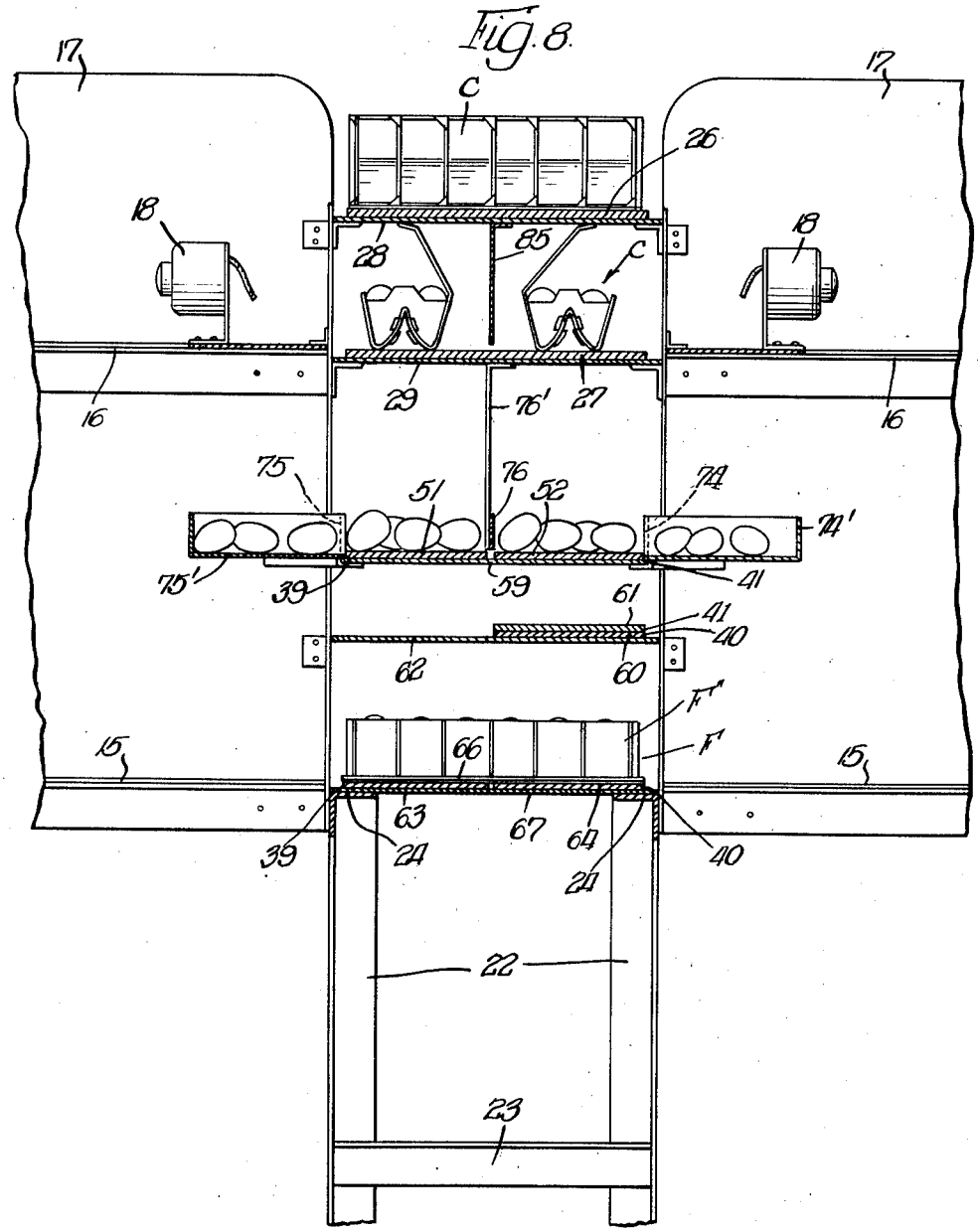

Patented May 5, 1953

2,637,435

UNITED STATES PATENT OFFICE 2,637,435

EGG HANDLING APPARATUS

Edward W. Fahey, Chicago, Ill., assignor to Shellmar Products Corporation, Chicago, Ill., a corporation of Delaware Application May 13, 1947, Serial No. 747,773

13 Claims. (Cl. 198—85)

1

The present invention relates to an improved egg handling apparatus for use in commercial egg candling rooms wherein large quantities of eggs are graded for quality and size and thereafter cartoned and packed in accordance with the grade thereof.

The advantages in increased grading efficiency and accuracy attained in a large capacity plant of the above type by locating all the egg candling personnel at a single area have been recognized for some time, because, for one reason, the work of said personnel is more easily supervised. Economy of space and equipment is another advantage of concentration of personnel. However, certain problems are presented in the inspection of eggs by a sizable number of employees concentrated at a single area, such as the maintenance of a constantly available supply of ungraded eggs, together with requisite cartoning and packing materials for the candlers, the ultimate disposition of the graded and cartoned eggs, as well as eggs not suitable for carton packing, and the disposition of the relatively bulky egg cases in which the eggs are usually packed. The present invention therefore deals with an improved apparatus which enables the advantages inherent in the concentration of candling personnel to be attained by affording novel and improved means for efficiently servicing the operating needs of said personnel, as above described.

It is a general object of the invention to provide a novel apparatus adapted to supply a number of candlers with loose, ungraded eggs in a constantly adequate supply, and with all necessary cartoning and packing materials therefor, in such manner that said eggs and materials are conveniently accessible to the candlers, yet do not occupy excessive space at the candler's working station, and to dispose of cartoned and uncartoned eggs or other materials in an improved manner.

Another object is to provide a conveyor type apparatus of the above type including supply or loading and discharge stations for the conveyor at which eggs and packing materials are supplied and the graded product is discharged and removed, which stations are located in close adjacency to one another to enable the employment of minimum personnel for the servicing of the candlers needs.

Yet another object is to provide an apparatus of the type referred to, including an improved and simplified belt type conveyor system characterized by a horizontal orbital-type conveyor and distributor which insures the presence of a con-

2 stantly available supply of loose eggs to a relatively large number of candlers located on either side of the conveyor, by means of a novel arrangement of laterally spaced, longitudinally extending conveyor belts or equivalent devices.

A still further object is to provide a conveyor type apparatus of the foregoing description which embodies vertically superposed and spaced belts, including a pair of belts having horizontally adjacent, aligned reaches whereon a constantly available supply of loose ungraded eggs is circulated in a horizontal, orbital path, so that said eggs are readily and conveniently accessible to the candlers.

Yet another object is to provide an apparatus of the above, superposed belt type in which the cartoned eggs are returned toward a point of initial supply of loose eggs and cartons by one or more other reaches of said superposed belts than said horizontally spaced reaches.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 2 is a view in side elevation of the apparatus in Fig. 1, further illustrating the layout of the conveyor components thereof with reference to the egg room and with reference to certain material supply means associated with the apparatus, other component parts of the general equipment having been omitted for the purpose of simplicity and clarity of disclosure;

Fig. 3 is a fragmentary and diagrammatic plan view of a portion of the apparatus of Figs. 1 and 2, viewed from the line 3—3 of Fig. 2 illustrating the means for providing an endless or orbital loose egg belt conveyor;

Fig. 4 is a fragmentary view in side elevation more clearly illustrating the arrangement of belts and belt drive means of the conveyor system of the apparatus;

Fig. 5 is a fragmentary view in transverse vertical section, generally along the line 5—5 of Fig. 4;

Fig. 6 is a schematic view in perspective serving to more clearly illustrate the basic elements of the belt conveyor system and their relation to one another;

Figure 1:
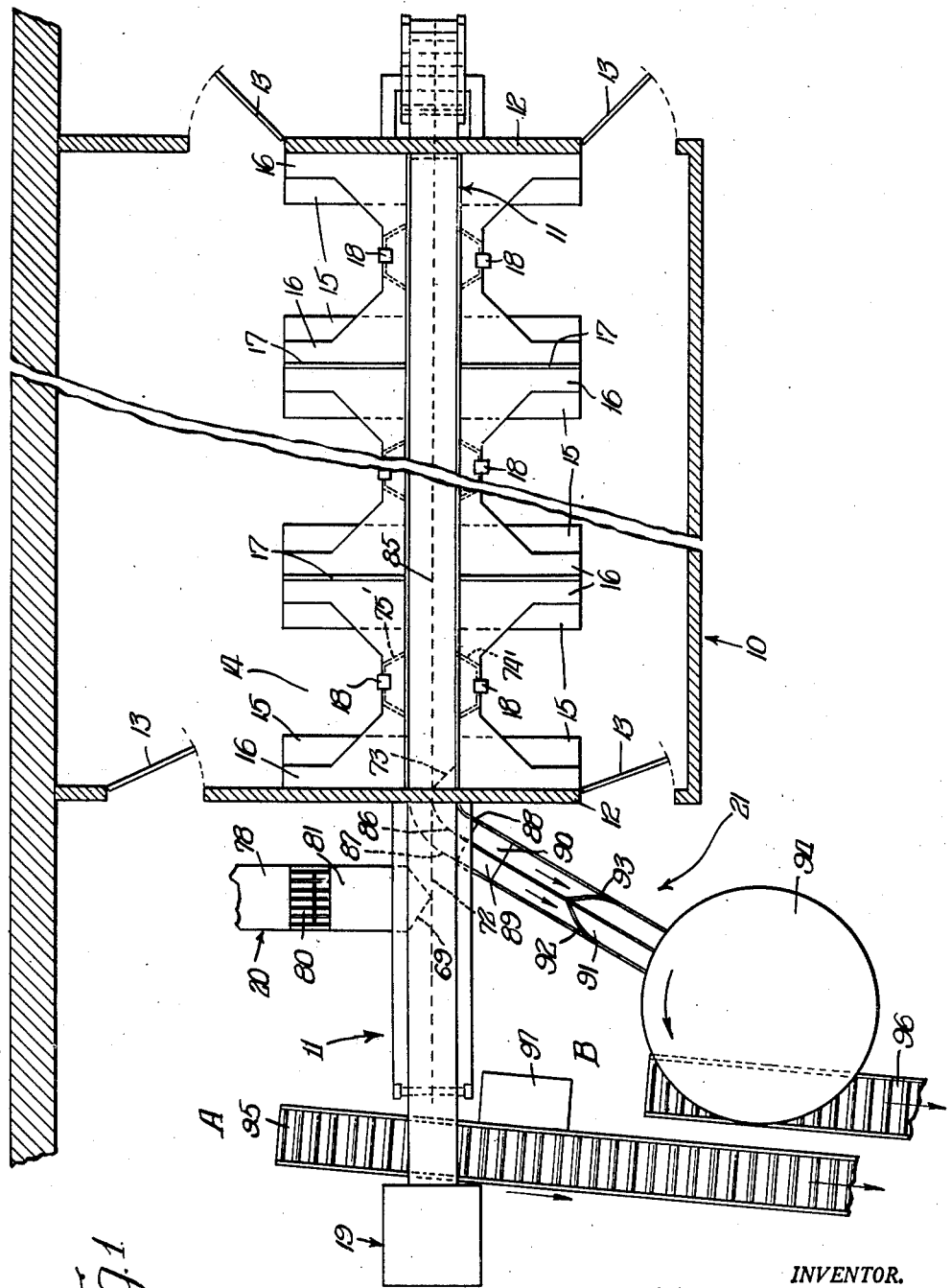
Fig. 1 is a diagrammatic plan view of an apparatus in accordance with the invention, as installed in a commercial egg room, together with certain associated loading or supply and delivery or discharge mechanisms.

Fig. 7 is a fragmentary perspective view illustrating a device for supplying ungraded eggs to the apparatus and indicating the relation of said device to the orbital conveyor system referred to above; and Fig. 8 is a fragmentary view in transverse vertical section, taken substantially on the line 8—8 of Fig. 2, further showing the vertical relationship of the several belt reaches of the conveyor system and confining means associated with the loose egg conveying and distributing belt thereof.

Figs. 1 and 2 of the drawings represent a general layout of the present apparatus in its relation to a commercial darkened egg room, generally designated 10, and to certain other known instrumentalities for supplying empty cartons to be filled with graded eggs, for closing the cartons and for handling other materials involved in the operation of said apparatus. A novel conveyor system, generally designated 11 and constructed as hereinafter described, passes longitudinally through the center of the egg room, to accommodate which the end walls 12 of the egg room are provided with appropriate light-sealed openings through which certain of the belt components of the conveyor system are adapted to pass. Access to the egg room is had through doors 13 in said end walls.

Candling booths or stations 14 are disposed internally of egg room 10 in aligned relation parallel to the conveyor system 11 and immediately adjacent either side of the latter. Each booth includes shelving 15 at a predetermined vertical level and further shelving 56 spaced thereabove for the accommodation of the various materials employed by the candler in the booth. The stations are separated from one another and defined as individual booths by the intervening vertical partitions 17. Each station has an individual candling light 18 at a convenient elevation.

The vertical placement of the shelving 15, 16 in the various booths is such as to enable convenient and comfortable handling of articles or materials by the candler, whether sitting or standing in the booth. Furthermore, the provision of the various components of the conveyor system 11, to be hereinafter described in detail, has the advantage of relieving the candler of the need for excessive handling of loose eggs, flats and fillers, cartons, cases and the like. A distinct drawback of previous egg rooms and installations of the general type here involved has been the necessity of performance by the candler of repeated, non-productive operations of this type resulting in operator fatigue and substantial diminution of output.

The reference numeral 19 generally designates a conventional automatic carton set-up machine of the type shown and described in U. S. Patent No. 2,018,396, dated October 22, 1935, wherein knocked-down paper board egg cartons, for example, of the type forming the subject matter of U. S. Reissue Patent No. 18,922 to Felix Troyk, dated August 22, 1933, are supplied and automatically erected or set up. A carton of this sort is shown in Fig. 8 of the drawings and generally designated C. However, it is to be clearly understood that neither the particular type of carton set-up apparatus 19 nor the particular type of egg carton are particularly controlling in the operation of the belt conveyor system of the present apparatus. The carton is filled manually by the operators.

The reference numeral 20 generally indicates a device located externally of the egg room for supplying eggs to be graded to the apparatus of the invention to be later described in detail, while the reference numeral 21 generally denotes certain further disposal instrumentalities or a disposal station adapted to receive and dispose of the materials issuing from the apparatus. These last named instrumentalities and the functions thereof will be hereinafter described generally, but they are not to be regarded as limiting on the invention for reasons which will appear.

The construction of the conveyor system 11 is particularly illustrated in Figs. 4, 5 and 8, to which reference is directed. Reference may also be made to the schematic illustration of the belt arrangement of said conveyor system depicted in Fig. 6. It should be understood that, while in the description to follow the conveyor system is described in terms of the several flexible endless belt components thereof, which are preferably of woven fabric, and the pulleys over which said belts are trained and by which they are driven, it should be clearly understood that this terminology is adopted solely for the sake of simplicity. Equivalent endless conveyor elements, for example of leather, woven wire, link or chain type, are contemplated, both in the specification and claims, to the extent that the physical and operating characteristics of such elements afford features compatible with the handling of the articles herein involved.

The conveyor system 11 is supported on a framework including the longitudinally and laterally spaced uprights 22 which may be of angle iron or other acceptable construction, the connecting braces or cross pieces 23, the longitudinal angle iron, side members 24, and certain other supporting frame structures which will be referred to as the description proceeds.

With particular reference to Figs. 4, 6 and 8 a relatively wide upper conveyor belt 25 extends longitudinally of the apparatus, with its respective upper and lower reaches 26, 27 in horizontal and parallel, substantially vertically spaced relation. These reaches are supported in this relation by respective horizontal, parallel and longitudinally extending belt-supporting platforms 28, 29, which are in turn supported on suitable angle brackets or the like affixed to the respective booth partitions 17. (See Fig. 8.) Belt 25 is trained around a drum-like pulley 30 at one end, by which it is driven, and at the other end around an idle pulley 31. Pulleys 30, 31, as well as the majority of other pulleys involved in the apparatus, are disposed externally of the egg room.

As diagrammatically illustrated in Fig. 1, these pulleys are disposed externally of the egg room 10, the shaft 32 of pulley 30 being journaled in a pillow block 33 carried by end frame uprights 22, while the shaft of pulley 31 at the opposite end of the belt is carried in journals 34 which are mounted for sliding adjustment on a guide 35. The belt tension is readily regulated or other adjustment made by these provisions, without disturbing the candling personnel in the egg room. The guide 35 is bracket-supported on an auxiliary framework 36 secured to the adjacent end wall 12 of the egg room, although other appropriate provisions for supporting the pulleys at this end of the apparatus are of course contemplated.

Belt drive pulley 30 has a sprocket 37 on its shaft which is driven by a link chain 38 driven in a manner to be hereinafter described.

A composite conveyor belt assembly is spaced substantially below the belt 25, being of substantially equal overall width. This assembly is made up of three flexible endless belts 39, 40 and 41 which are associated as follows. Belts 39, 40 are trained around a common driving pulley or drum 42 which is located in the vertical plane of the drive pulley 30 for upper belt 25, said pulley 42 being of a width equal to that of pulley 30. The opposite ends of said belts 39, 40 are trained around an idler pulley 43 whose axis is in the vertical plane of and beneath pulley 31. Idler pulley 43 is supported on the auxiliary frame 36 by adjustable means similar to the support for pulley 31, hence not necessary to describe again.

The common drive pulley 42 for belts 39 and 40 has its shaft 44, which is the main pulley drive shaft, borne in pillow blocks 45, in the manner illustrated in Fig. 4; and shaft 44 is driven from a geared motor and speed reducer 46 supported on a platform 47 on the framework. This drive is effected by a motor-driven chain 48 which passes around a sprocket 49 on pulley shaft 44. Said shaft has a further sprocket 50 secured thereto, on the side thereof adjacent the drive chain 38 for the upper drum 30, which further sprocket is drivingly engaged by said chain 38 to drive drum 30 and the upper belt 25.

The upper reach 51 of belt 39 extends horizontally and parallel to the upper belt reaches throughout its length, but the corresponding reach of belt 40 is deflected downwardly under engagement by the lower horizontal reach of belt 41, which is substantially shorter than the other two belts. The disposition of the belt 41 is such that its upper reach 52 parallels and is horizontally coplanar with reach 51, being located in closely adjacent, parallel and side-by-side relation to the latter. The aforesaid lower reach of the belt 41 travels horizontally in contact with the upper reach of belt 40, and all of the belts 39, 40 and 41 are driven at the same linear speed so that there is no relative longitudinal slippage between contacting belts 40 and 41 or relative movement between corresponding reaches of either of these belts and the belt 39.

Belt 41 is trained around a driving pulley 53 located adjacent but spaced slightly inwardly of the pulley 42, and around an idle pulley 54 adjacent but inwardly of the pulley 43, the shaft 55 of the drive pulley 53 being carried in pillow blocks 56 on the apparatus frame. The idle pulley 54 is adjustably supported on the auxiliary frame 36 in the manner described above. Pulley shaft 55 has a pinion 57 secured thereon which meshes with a gear 58 fixed on the main pulley drive shaft 44, the ratios of gear 58, pinion 57 and sprockets 49, 50 and 37 being such that the belt 41 is driven at equal linear speed with belts 39, 40 as mentioned above.

Belts 39, 40 and 41 are preferably of equal width and are preferably one-half the width of the upper belt 25, inasmuch as they are intended to service a theoretically equal number of candlers on each side of the conveyor system 11 of which they are a part.

Referring to Fig. 8, the upper, coplanar reaches 51 and 52 of belts 39 and 41 respectively are slidably supported on and maintained in horizontal position by a platform support or table 59 entirely similar to the platform surfaces 28, 29 for upper belt reaches 26, 27 and similarly supported on the partitions 17. The upper reach of belt 40, which is designated 60, and the contacting lower reach of belt 41, designated 61 which is superposed thereon may also be positively sustained by a further platform support 62. Portions of the lower reaches 63 and 64 of the belts 39 and 40, respectively, which travel oppositely to reaches 26 and 51 and in the same direction as reaches 27 and 52, are disposed in horizontal position and in parallel, coplanar and side-by-side relation, spaced substantially below the upper reaches of said last named belts so as to afford a still further conveyor section. To this end, the reaches 63, 64 extend horizontally from the pulley 43, which is common thereto, for a substantial longitudinal distance but still short of drive pulley 42, thence over a common idler guide pulley 65 and then downwardly and reversely around a further common idler pulley 66, prior to returning to the drive pulley 42.

Thus there is constituted a third composite but unidirectional belt conveyor of partial length which is disposed in vertically aligned and spaced, parallel relation beneath the conveyors constituted by reaches 26 and 27 of the upper belt and the intervening, oppositely traveling reaches 51, 52. Direction of travel of the several reaches is clearly indicated by arrows in Fig. 6. The shorter reaches 63, 64 are vertically sustained in their horizontal travel by a support 67 extending throughout a major portion of the length of said reaches and mounted on the parallel side members 24 of the frame, as illustrated in Fig. 8.

A discharge shelf or table 68 is appropriately mounted on the frame adjacent or slightly below the upper surface of the last described reaches 63, 64 and in close adjacency to the common pulley 65 for the latter, being thus in a position to receive articles returned toward the supply point of the apparatus on said composite conveyor belt. The table 68 is located externally of the egg room, in the manner illustrated in Fig. 2, and is appropriately supported on the framework of the apparatus.

The upper ingoing and lower return reaches 26, 27 of upper conveyor belt 25, as well as the composite horizontally parallel lower return reach presented by belts 39, 40 are available as uni-directional article-conveying instrumentalities for the transportation of objects in supply or return directions, as indicated by the arrows. The intervening, composite, bi-directional conveyor constituted by the oppositely traveling upper reaches 51, 52, respectively, of belts 39, 41 is employed for supplying and distributing loose eggs to the candling personnel at the booths on either side of and spaced longitudinally along the belt conveyor system. For this purpose, reaches 51, 52 have means associated therewith for causing the eggs to travel, or tend to travel, in an elongated orbital path on said oppositely moving belt reaches whereby a supply of eggs is constantly furnished and maintained at the candling stations in convenient reach of the candlers.

The means last referred to includes the fence and divider structure which is illustrated in Figs. 3, 5 and 7. This embodies an angled upstanding sheet metal divider and director rail, generally designated 69, which is supported in vertically spaced relation to the reaches 51, 52 on an angle iron bracket or brackets 70 (see Fig. 5) mounted on the belt sustaining surface 59 to one side of belt 39. Said rail comprises a longitudinally and transversely angled directing fence portion 71 leading from the discharge side of the loose egg supply mechanism 20 shown in Fig. 7, being integrally connected to a retaining side wall of said mechanism, then across belt reach 51 at an angle to merge with an intermediate divider portion 72. Portion 72 extends medially along and parallels the adjacent edges of reaches 51, 52 until it merges with a second angled directing fence portion 73 which is inclined longitudinally and transversely parallel to fence 71 across the reach 52. The fence portion 73 in turn, merges with a longitudinal side confining rail 74 paralleling the outer edge of belt reach 52 and secured to the supporting bracket or brackets 70 for the rail structure.

A similar rail 75 parallels the portion 74 along the opposite side of the reach 51, merging with a second retaining side wall of the egg supply mechanism 20. These last named rail portions are for the purpose of laterally confining eggs discharged onto and transported on the oppositely traveling reaches 51, 52, yet leaving the loose eggs readily available at the candling stations longitudinally traversed by the conveyor. It is desirable that the rails 74, 75 be offset outwardly at each candling station 14 and that individual outwardly projecting candling trays 74', 75' be provided at each offset, appropriately supported on the frame to afford a fixed pocket into which eggs withdrawn from the distributing reaches may be placed.

A central divider or barrier 76 is disposed longitudinally of the adjacent edges of the belt reaches 51, 52, in vertically spaced relation thereto (see Figs. 5 and 8). This divider may be suspended by hanger 76' from the platform support 29 for the upper belt 25. It is longitudinally aligned with but spaced at its forward edge from the divider portion 72 of rail 69 as illustrated in Figs. 3 and 7, and extends a substantial distance along the length of the coacting reaches 51, 52, serving to separate eggs on the former from those on the latter and to direct the eggs along the elongated side legs of their orbital path of travel.

The rail structure for the bi-directional loose egg distributing arrangement is completed by an angled rail 77 which extends longitudinally and transversely across the two reaches 51, 52, in vertically spaced relation to the same to unite the corresponding ends of confining rails 74, 75, being in longitudinally spaced relation to the adjacent end of the central divider 76.

The foregoing provisions constitute an orbital supply and distribution system adapted to receive loose, ungraded eggs from the mechanism 20, to be described, and to distribute and maintain a constant, adequate supply of such eggs adjacent the respective candling booths or stations 14 on either side of the conveyer 11. Eggs discharged from the mechanism 20 impinge the fence and rail portions 71, 72 and are transported by reach 51 in the inward longitudinal supply direction, being removed for candling as desired by the candlers from the trays or pockets 75'; into which the eggs tend to travel as they traverse the machine. Such eggs as arrive at the end of this reach 51 impinge the rail 77 and are deflected laterally onto the oppositely traveling return reach 52, after traversing which those articles which do not travel into the trays 74' are deflected by fence portion 73 back onto the reach 51. Hence eggs are readily supplied to the various candling stations when the apparatus is initially set in operation and are thereafter maintained in constant adequate supply during the day's work.

The loose egg supply mechanism at which the eggs are removed from the flats and fillers in which they are customarily disposed and packed, prior to grading, is illustrated in Fig. 7. It comprises a continuous, suitably driven belt conveyor 78 traveling around a drum or pulley 79 adjacent its discharge end, on which conveyor the flats and fillers F containing ungraded eggs are placed by service personnel. A plurality of stripper fingers 80 are carried by an adjacent, laterally extending, gravity discharge table 81, said fingers projecting toward the belt 78 at such an elevation and for such a distance that their extremities are located to pass between the flat F' of the flat and filler assembly F and the superposed, cell-type filler F''. Fingers 80 thus serve to separate these two parts, the flat F'' falling into a suitable receiver therebeneath.

The fingers 80 are spaced sufficiently closely to support the eggs in the filler as the latter is projected by conveyor 78 onto the fingers and, like the discharge table 81, are inclined downwardly toward the longitudinal conveyor system 11. The elevation of table 81 is such that loose eggs deposited on the fingers 80 when the filler F'' is lifted therefrom by an attendant will gravitate down the table and be discharged onto the belt reach 51. The sides of the table are provided with upstanding retaining walls 82 to confine the eggs as they travel downwardly therealong, said walls joining or merging with the fence and rail portions 71, 75, as previously mentioned.

In operation, at the beginning of the day's run, a service attendant supplies the carton set-up machine 19 with knocked-down cartons and places this machine and the apparatus in operation. Cartons C are discharged by said set-up machine along an upwardly aligned ramp 83 in a continuous, partially nested stream onto the upper, ingoing reach 26 of the uppermost belt 25. Empty filler-flat assemblies F are also placed and transported on reach 26 from time to time. The cartons and assemblies are conveyed along this reach past the candling stations 14 at a convenient distance from the candlers, and are removed from said reach by the candlers as needed. Should the entire length be traversed and the reach still occupied by empty cartons, the belt 25 will simply slide therebeneath, a stop 84 being provided at the end of the reach and adjacent the egg room wall to engage and strain the cartons.

Following candling and placing of the candled eggs in the cartons in accordance with one of several grades, the filled cartons are disposed on the lower, return reach 27 of the belt 25. Said filled cartons are adapted to be placed on said last named reach with the covers thereof upstanding, as illustrated in Fig. 8, and a central longitudinally extending divider partition 85 depending from the uppermost belt guiding platform 28 separates the lines of filled cartons deposited from either side of the conveyer. Said cartons are transported on belt reach 27 toward the earlier mentioned carton closing mechanism 21, the operation of which will be referred to in the paragraphs to follow.

With the candlers in their positions in booths 14, each candler removes from belt reach 26 a supply of egg cartons C" and filler-flat assemblies F which she arranges on shelving 15, 16 within easy arms reach. These materials are supplied to the reach 26 by set-up machine 19 and by an attendant at that station. The filler-flat assemblies are for the purpose of receiving eggs not suitable for cartoning, such as checks, dirties, and eggs unsuitable for consumption. After arranging her packaging materials properly, the candler removes a supply of eggs from reach 51 or 52 (depending upon the side of the conveyor system at which she may be working) places this supply in tray 74' and proceeds to candle them across the beam of candling light 18. The functioning of the device 20 in supplying these eggs has been explained. As the loose eggs are removed from the belt reaches the space vacated is soon filled by others and a constant supply of loose eggs is maintained within easy reach of each candler.

As best shown in Fig. 8, as each egg carton is filled the candler places it, with its cover still open, onto reach 27 of belt 25 with the rear wall of the carton adjacent depending longitudinal partition 85. As each filler-flat assembly F is filled the candler places the assembly on the composite return conveyor constituted by the partial horizontal lower reaches 63, 64 of belts 39, 40 respectively. The several grades of eggs are thus transported in a common direction but at different levels to the disposal station 21 outside the darkened egg room.

Referring to Fig. 1, depending partition 85 merges adjacent the left eggroom wall 12 with a carton diverter which typically may consist of an arcuate center guide 86 and side guides 87, 88 which are disposed in laterally spaced parallel relation thereto. Guides 86, 87 and 88 are spaced above belt reach 27 sufficiently to permit the latter to pass thereunder and are of sufficient height to properly direct the filled egg cartons at an angle from the straight line of travel such cartons had while on said reach.

The outer end of the carton diverter described above discharges the filled but unclosed cartons onto a conveyor comprising a pair of parallel, coplanar endless belts 89, 90 which travel in a common direction to carry the cartons through a two lane carton closer 91, which may be of the type shown in U. S. Patent No. 1,994,241 to Martin Burger. Angularly directed cover depressing guides 92, 93 of said closer depress the carton covers and other mechanism (not shown, but integral with closer 91) operates to lock the covers in closed position, as contemplated by the Troyk patent mentioned above. After the cartons are closed the closer 91 discharges them onto the rotary table 94 shown in Fig. 1, from which they are removed for case packing.

Filler and flat assemblies F, containing uncartonable eggs of the types mentioned above, are discharged by belt reaches 63, 64 onto the top of the shelf 68 shown in Figs. 4 and 6 from which they may be removed, appropriately marked and disposed of by an attendant for repacking.

It will be noted by reference to Fig. 1 that a roller conveyor 95, which is inclined in the direction shown by an arrow, traverses the above described conveyor system adjacent carton set-up machine 19, for the disposal of empty egg cases and surplus fillers and flats. Another roller conveyor 96, inclined in the same direction and generally parallel thereto, is positioned adjacent rotary table 94 for the disposition of filled egg cases.

The saving in personnel made possible by the above apparatus is one of its important advantages. A single operator works adjacent set-up machine 19, or in this general area, denoted A. She maintains a supply of knocked-down egg cartons in the hopper of the set-up machine, oversees the automatic operation thereof and the flow of set-up cartons to its inclined chute and onto belt flight 26. She also removes eggs from the opened case of eggs to be candled and oversees the removal of the eggs from the filler-flat assemblies F by loose egg supply mechanism 20. From time to time she places on belt flight 26 a supply of flats and collapsed fillers for the use of the egg candlers in disposing of uncartonable eggs.

Empty egg cases are disposed of by being placed on conveyor 95, by which they are transported to a station (not shown) for final disposition. A certain number of cases are removed from conveyor 95 by a packer working in area B adjacent the disposal apparatus 21 (see Fig. 1). These empty egg cases may typically be placed on benches such as that designated 97. The cases are then filled with eggs of a single grade, taken either from table 68 (i. e., uncartoned eggs enclosed in flat-supported fillers), or from rotary table 94, the latter being the receiver for closed egg cartons.

When the operator in area B has completely filled a case, the case cover is replaced and the case disposed of by being placed on conveyor 96, to be gravity-conveyed to an appropriate loading or storage area (not indicated).

From reference to the drawings and the foregoing description it will be apparent that there is provided by the structure of the invention a novel type egg room in which the service operations, i. e., the maintenance of the supply of packaging material and the supply of eggs for the candlers, as well as temporary storage and disposal of empty and filled cases, are concentrated in adjacent areas which require but a small number of service personnel. Each operator may do more than a single operation. Additionally, the candlers are assured of a constantly available supply of packing materials, and eggs to be worked on. The packing materials and eggs are received and disposed of by means easily accessible to the candler, and at no time need the candler have in her booth more than a minimum amount of packing materials. No egg cases need be in the booth, requiring a large, and efficiency-reducing, floor area such as has in the past characterized all large commercial installations with which I am acquainted.

The arrangements described above enable the candler to devote all her time to candling operations and are such that these operations may be performed, either sitting or standing, with a maximum of speed and efficiency.

What I claim is:

1. A conveyor system comprising a pair of horizontally traveling endless belts, certain corresponding reaches of which are non-coplanar, and a third endless belt having a reach coplanar with one of said corresponding reaches of said belt pair in close side-by-side relation thereto, and a reach traveling in contact with the other of said corresponding reaches of said pair, said coplanar reaches each being of width at least as great as that of articles conveyed by said system.

2. A conveyor system comprising a pair of horizontally traveling endless belts, certain corresponding reaches of which are non-coplanar, a third endless belt having a reach coplanar with one of said corresponding reaches of said belt pair in close side-by-side relation thereto, and a reach traveling in contact with the other of said corresponding reaches of said pair, said coplanar reaches each being of width at least as great as that of articles conveyed by said system, and means to drive the three belts at equal linear speed and with said coplanar reaches traveling in opposite directions.

3. A conveyor system comprising a pair of horizontally traveling endless belts, certain corresponding reaches of which are non-coplanar, a third endless belt having a reach coplanar with one of said corresponding reaches of said belt pair in close side-by-side relation thereto, and a reach traveling in contact with the other of said corresponding reaches of said pair, said coplanar reaches each being of width at least as great as that of articles conveyed by said system, further reaches of said first named pair of belts being coplanar.

4. A conveyor comprising a pair of horizontally disposed, endless belts carried in relatively close side by side relation by end pulleys common to both, the upper reaches of said belts being non-coplanar, a third endless belt paralleling and superposed on the upper reach of one of the belts of said pair and traveling in contact therewith, the upper reach of said third belt being coplanar with the upper reach of the other belt of said pair, and means to divert articles traveling on one of said last named coplanar reaches onto the other.

5. A conveyor comprising a pair of horizontally disposed, endless belts carried in relatively close side-by-side relation by end pulleys common to both, the upper reaches of said belts being non-coplanar, a third endless belt paralleling and superposed on the upper reach of one of the belts of said pair and traveling in contact therewith, the upper reach of said third belt being coplanar with the upper reach of the other belt of said pair, said copanar belt reaches traveling in opposite linear directions, and means to divert articles traveling on one of said last named coplanar reaches onto the other.

6. A conveyor comprising a pair of horizontal endless belts in close side-by-side relation, the upper reaches of said belts being non-coplanar, a third horizontal endless belt having its upper reach coplanar with the upper reach of one belt of said pair and its lower reach engaging and deflecting the upper reach of the other, each of said upper coplanar reaches being of width at least as great as that of articles handled by said conveyor, the lower reaches of said pair being coplanar, and means substantially in the plane of said last named reaches to receive articles transported thereon.

7. A conveyor comprising a pair of endless belts in close side-by-side relation, the upper reaches of said belts being non-coplanar, a third endless belt having its upper reach coplanar with the upper reach of one belt of said pair and its lower reach generally coplanar with the upper reach of the other of said pair, mean to drive said last named upper coplanar reaches in opposite directions and means to divert articles traveling on one thereof onto the other.

8. A conveyor comprising a pair of endless belts in close side-by-side relation, the upper reaches of said belts being non-coplanar, a third endless belt having its upper reach coplanar with the upper reach of one belt of said pair and its lower reach generally coplanar with the upper reach of the other of said pair, each of said upper coplanar reaches being of width at least as great as that of articles handled by said conveyor, the lower reaches of said pair being coplanar, means to drive said last named upper coplanar reaches in opposite directions and means to divert articles traveling on one thereof onto the other.

9. A conveyor comprising a pair of endless belts in generally side-by-side relation, the upper reaches of said belts being non-coplanar, a third endless belt having its upper reach coplanar with the upper reach of one belt of said pair and its lower reach generally coplanar with the upper reach of the other of said pair, and means for imparting movements to said respective upper coplanar reaches which are in opposite directions to one another.

10. In an apparatus of the type described, means for circulating loose articles before a plurality of adjacent stations comprising two elongated, endless belt type conveyors having like corresponding reaches operating horizontally in coplanar, side-by-side relation and in opposite longitudinal directions, a longitudinal barrier separating the spaces over said respective reaches, means laterally confining the respective remote longitudinal sides thereof to define two distinct paths of opposite longitudinal travel for loose articles thereon, a pair of diverters extending above and across said reaches, said diverters being spaced from one another longitudinally of said reaches and located longitudinally outward of the ends of said barrier for shunting articles from one conveyor reach to the other for an orbital travel on the conveyors, and means supplying loose articles to said circulating means between said diverters.

11. In an article handling apparatus, a longitudinally extending, material distributing conveyor system comprising a pair of generally parallel, endless belts disposed laterally adjacent one another, said respective belts having oppositely traveling reaches arranged in substantially coplanar, close side-by-side relation, means coacting with said reaches to define a horizontal orbital conveyor for the distribution of articles thereon lengthwise and transversely of the system, another reach of one of said belts extending substantially horizontally in vertically spaced relation to the first named reach thereof, and a further endless belt having a horizontally extending reach traveling uni-directionally with said last named reach and coacting therewith in the transportation of material disposed thereon.

12. In an article handling apparatus, a longitudinally extending, material distributing conveyor system comprising a pair of generally parallel, endless belts disposed laterally adjacent one another, said respective belts having oppositely traveling reaches arranged in substantially coplanar, close side-by-side relation, means coacting with said reaches to define a horizontal orbital conveyor for the distribution of articles thereon lengthwise and transversely of the system, including transversely extending baffle means to shunt articles from one of said reaches to another and means for supporting said baffle means being in vertically spaced relation to said reaches, another reach of one of said belts extending substantially horizontally in vertically spaced relation to the first named reach thereof, and a further endless belt having a horizontally extending reach traveling uni-directionally with said last named reach in close side-by-side relation thereto and coacting therewith in the transportation of material disposed thereon.

13. In an article handling apparatus, a longitudinally extending, material distributing conveyor system comprising a pair of generally parallel, endless belts disposed laterally adjacent one another, said respective belts having oppositely traveling reaches arranged in substantially coplanar, close side-by-side relation, means coacting with said reaches to define a horizontal orbital conveyor for the distribution of articles thereon lengthwise and transversely of the system, another reach of one of said belts extending substantially horizontally in vertically spaced relation to the first named reach thereof, a further endless belt having a horizontally extending reach traveling uni-directionally with said last named reach in close side-by-side relation thereto and coacting therewith in the transportation of material disposed thereon, and a support disposed adjacent an end of said last named, coacting reaches for the reception of said material therefrom.

EDWARD W. FAHEY.

References Cited in the file of this patent

UNITED STATES PATENTS

| Number | Name | Date |
|---|---|---|
| 862,148 | Filteau | Aug. 6, 1907 |
| 1,516,016 | Kallenbach | Nov. 18, 1924 |
| 1,716,404 | White | June 11, 1929 |
| 2,003,097 | Vickery | May 28, 1935 |
| 2,108,869 | Sandmeyer | Feb. 22, 1938 |
| 2,481,440 | Page | Sept. 6, 1949 |